April 5, 1927.

W. L. HANCOCK

HULLER AND OPENER

Filed Oct. 9, 1926

INVENTOR
William L. Hancock
By Mitchell, Chadwick & Kent,
ATTORNEYS

April 5, 1927.

W. L. HANCOCK

HULLER AND OPENER

Filed Oct. 9, 1926

INVENTOR
William L. Hancock
By Mitchell, Chadwick + Kent,
ATTORNEYS

Patented Apr. 5, 1927.

1,623,181

UNITED STATES PATENT OFFICE.

WILLIAM L. HANCOCK, OF DALLAS, TEXAS, ASSIGNOR TO THE MURRAY COMPANY, OF DALLAS, TEXAS, A CORPORATION OF TEXAS.

HULLER AND OPENER.

Application filed October 9, 1926. Serial No. 140,513.

My invention is an improvement in machines for cleaning seed cotton from burrs and hulls and picking the seed cotton therefrom.

The frame X which encloses and supports the moving parts of my machine may be of angle iron and of rectangular shape in cross section and supports the bearings for the various moving parts of the machine, as will be plain without further specification.

The main element of my device is a drum 1, rotating in a vertical plane upon suitable bearings 11, actuated by a driving pulley $11^a$. This drum is covered with card clothing, secured upon the drum in any suitable way. The wire teeth $1^x$ of the card clothing, as is common, are of tempered steel, bent to project in the direction of movement of the carrying drum and after being placed upon the drum and at intervals thereafter are ground to an edge, in a well-known manner. At the inside of the front of the machine (left side in Figure 1) upon the cross and side frame members are secured the various mechanical elements which jointly and severally co-operate with the drum element in performing the necessary operations upon the seed cotton.

Figure 1:
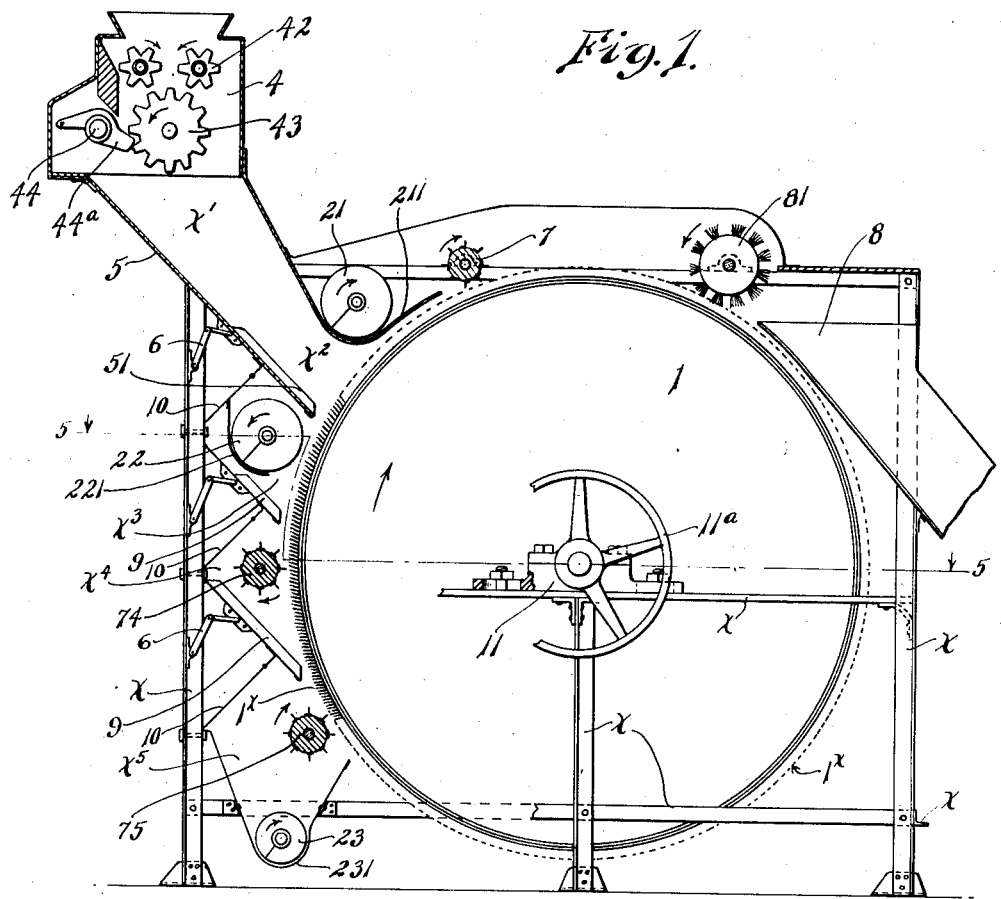
Figure 1 is a vertical, sectional elevation of my improved machine.
Figure 5:
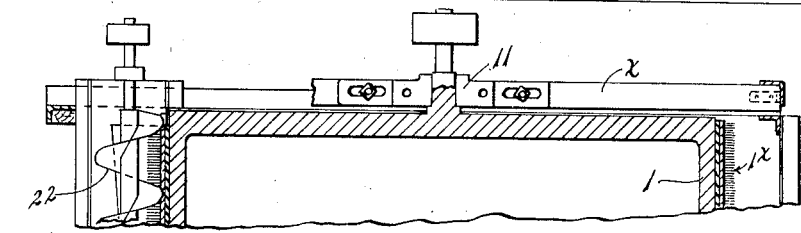
Figure 5 is a section on line 5—5 of Figure 1.
Figure 5:
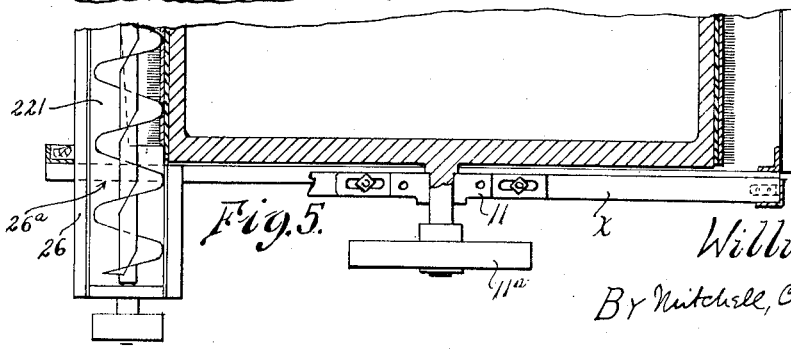
Figure 3:
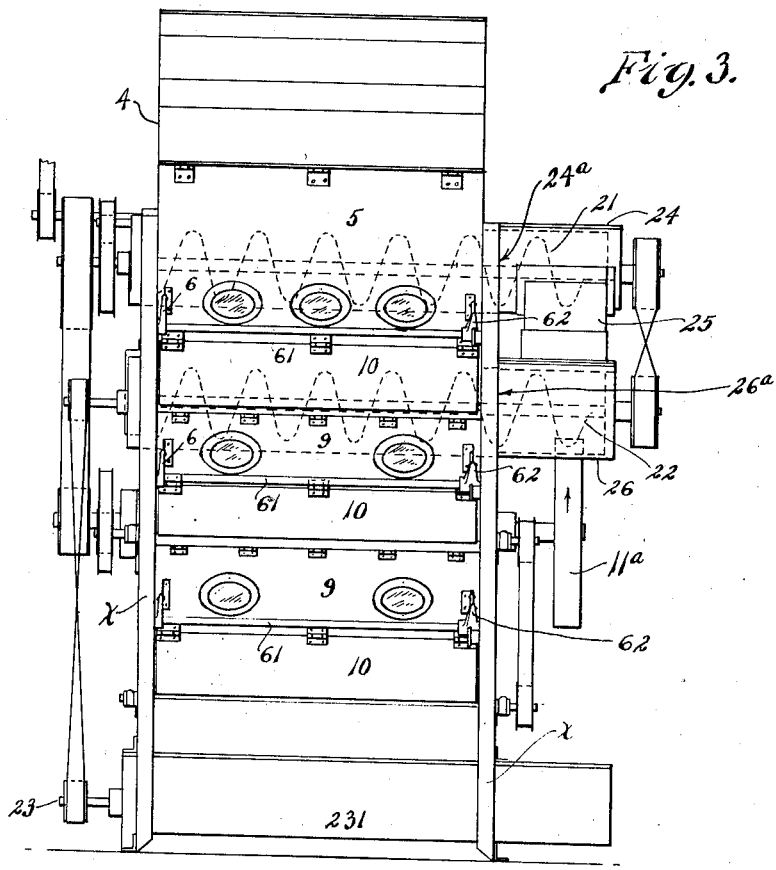
Figure 3 is a front elevation.

Referring now particularly to Figure 1, it will be noted that three conveyors, 21, 22 and 23 are placed across the machine, which are carried at their ends in suitable bearings upon the frame of the machine, one end of the conveyors 21 and 22, passing outside the frame upon the same side and being contained severally in boxes 24 and 26 (see Figure 3). The under side of box 24 is open and above box 26 and connected therewith by a chamber 25, the upper side of box 26 being open. The conveyors 21, 22 and 23 are severally provided with troughs 211, 221, 231, to sustain and guide the material being conveyed, as required.

At the upper part of the front of frame X an upper feed opening X' is formed across the face of the casing and outside this opening, without the frame, is placed a boll breaking mechanism, made up of feed rolls 42, turning on the direction of the arrows and delivering the seed cotton in the form of a loose bat to the toothed breaker cylinder 32 by which the cotton is struck and thrown against the teeth $44^a$ of the breaker bar 44 and from the boll breaker the seed cotton then passes to the feed opening X' of the machine, and slides down a chute 5 and against the teeth $1^x$ of the card clothing on the drum 1.

By this preliminary treatment by a boll breaker the bolls and hulls in the seed cotton are crushed and opened and prepared for the efficient action of the cleaning mechanism.

The chamber $x^2$ into which the cotton is introduced, as above described, is closed above by the trough 211 and below by the adjustable end 51 of the chute 5. The adjustability is effected by connecting the end 51 of chute 5 with a toggle arm 6, which may be operated from without the casing by a shaft 61 and handle 62, which may be secured in adjusted position by a sector and thumb screw or other suitable detent mechanism, not shown. The inner end of the toggle arm may be secured to the underside of a chute in any one of several positions, as indicated in Figure 1. Chutes 9 are also adjustable by similar means. Within the trough 211 is a helical conveyor 21, a passage being left between the underside of trough 211 and the upwardly moving teeth $1^x$ on the drum 1. Above the conveyor 21 is a knocker roll 7, rotating as indicated by the arrow.

It will be convenient here to indicate the operation of the means described. Seed cotton is introduced into chamber $X^2$ through the feed opening $X^1$, the cotton sliding down the chute 5, 51, and the cotton mass is shot against the teeth $1^x$ by which the lint is engaged and carried upward, some of the broken hulls and bolls and the like being carried by the adhering lint, but the teeth $1^x$ not generally engaging the hulls, as the teeth are closely set and the hulls cannot enter between the teeth or become impaled thereon. The lint with any adhering hulls is carried upward past trough 211, and knocker roll 7, rotating as indicated by the arrow, beats back the hulls and most of the material not directly engaged by the teeth, this beaten back material falling by gravity into trough 211 and conveyor 21. The lint engaged by teeth 1$^x$ is carried to the exit 8 and removed by any suitable means. I have indicated a rotary brush 81, as such suitable means.

Any hulls or lint not carried up from chamber X$^2$ will work downward by gravity through the space between the teeth 1$^x$ and the adjusted end 51, of chute 5, into chambers X$^3$ and X$^4$ where the lint will be engaged by teeth 1$^x$ and thrown by roller 74 against teeth 1$^x$, and the lint engaging with teeth 1$^x$ will be carried up to the exit 8.

The material delivered into conveyor 21 is moved longitudinally of the trough 211 to one end of the casing and through an exit opening 24$^a$ in the end of the machine into box 24 through the open bottom of which it falls through a chamber 25 into the box 26, the top of which is open, where it is engaged by helical conveyor 22 lying in trough 221, which conveyor rotating in the opposite direction from conveyor 21 receives the seed cotton through an opening in the upper side of box 26 and moves the material longitudinally of trough 221, through a lower inlet opening 26$^a$ into and across the machine in chamber X$^3$. The underside of trough 221 is cut away in part, so that as the material is moved along in chamber X$^3$, a part of it is constantly being spilled onto chute or baffle 9, below the trough and is thus guided against the upwardly moving teeth 1$^x$ by which it is engaged and carried up where it comes under the action of beater 7 which disengages hulls and the like from the lint engaged by teeth 1$^x$ and beats the hulls into trough 211 to be again passed out of and into the machine and through chamber X$^3$ and into chamber X$^4$ where roller 74 will coact with the teeth 1$^x$. That part of the material which is not engaged in chamber X$^4$ falls into chamber X$^5$ where roller 75 operates upon it and the rejected hulls and trash finally reach conveyor 23 by which they are removed from the machine. At the end of these operations the lint has been separated, shaken and beaten free from hulls and trash, the freed lint ascending with the drum to the exit 8 as it is freed and the rejected material successively descending by gravity to a lower level for another operation until finally all the lint is freed and the rejected material, consisting in its final stage of hulls and trash, is deposited upon the trash conveyor, 23, and ejected from the machine at the bottom.

It will be apparent from the foregoing description that my machine is in effect a duplex machine, having an inlet X$^1$ and a lint exit 8 and also an exit 24$^a$ and a lower inlet 26$^a$ co-operating therewith, through which a substantial portion of the material entering at inlet X$^1$ re-enters the machine after having been ejected through exit 24$^a$ the material entering through inlet 26$^a$ being fed across the machine and caused to descend by gravity to undergo a series of operations to enable the teeth 1$^x$ to gather and convey to the lint exit 8, all clean lint.

It is advantageous and economical to hinge to the underside of the several chutes 51 and 9, cover members 10, which move with the chutes as they are adjusted and automatically adjust themselves to a new position, forming a roof or cover for each chamber to prevent material from being scattered and aid in condensing it and guiding it onto a chute or against a beater.

I have shown in the drawings the roll 7 as provided with angle iron beating elements. This is preferable for this roller whose main function is as a knocker, to knock material not engaged by the teeth 1$^x$ back and into the trough 211. In the other rollers, 74, 75, I prefer to use pins, as preferable where the function of the roller is more largely to engage and feed seed cotton against the teeth 1$^x$.

Figures 2, 4:
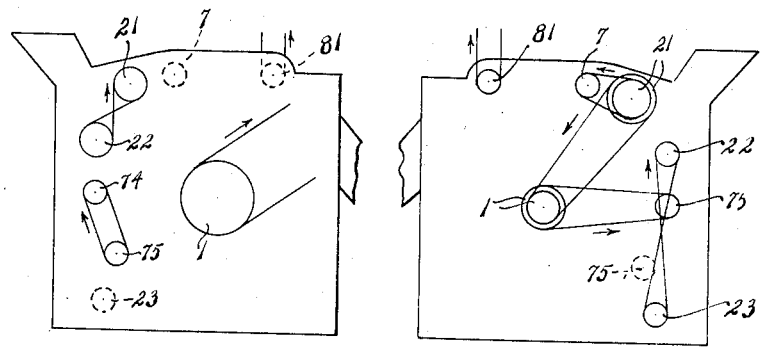
Figure 2 is a side view, on a reduced scale, of Figure 1, showing the belting lay out.
Figure 4 is a view on a reduced scale showing the other side of Figure 2 and the belting layout.

I have shown in Figures 2 and 4 a diagram of the belting layout for the hull separator and opener, with arrows indicating direction of travel of the belts. In these diagrams the actuating pulleys are indicated by the lettering of the working elements within the mechanism. Thus, the pulleys upon the shaft of drum 1 are marked 1 in these diagrams. The pulley 1 in Figure 2 is belted direct to a driving shaft, pulley 81 in Figure 4 is also belted direct to a driving shaft. The boll breaker 4 is also independently belted to a driving shaft. The belting of the boll breaker is so obvious that I have not thought it necessary for clear understanding to illustrate it.

I claim:

1. In a duplex cotton hull separator and opener, a frame-casing having upper and lower lint inlet openings and two lint exit openings; a rotatable toothed drum supported on the frame the surface of the drum opposed to the upper inlet opening moving upward to a lint exit opening; a chute adjacent the upper feed opening to receive the entering material and guide it against the toothed drum; a knocker roller adjacent the upper part of the drum, to beat back hulls and loose material while permitting the drum-engaged lint to pass on to an exit; means to remove the lint from the drum; a trough below the knocker roll to receive the material beaten back; a conveyor within the trough to move said material along the trough to an exit; a second conveyor below said exit to receive the material and return it within the casing through the lower feed opening; a chute over which the second conveyor moves the material and down which it is guided against the toothed drum.

2. In a cotton hull separator and opener, a frame-casing having a feed opening and a lint exit opening; a rotatable drum clothed with wire teeth, the face of the drum opposed to the inlet opening moving upward to the lint exit opening; a chute adjacent the feed opening; a knocker roll adjacent the upper part of the drum to beat back hulls and loose material, while permitting the drum engaged lint to pass on to the exit; means to remove the lint from the wire teeth.

3. In a duplex cotton hull separator and opener, a frame-casing having a cotton inlet opening into an intermediate inlet feed compartment; a compartment above the inlet feed compartment; a knocker roll in said compartment; a compartment below the inlet feed compartment; a by-pass from the upper compartment to said lower compartment; means to move the material from the upper compartment to the by-pass; means to move the material from the by-pass again into the casing; a lint engaging toothed-drum, one face of which moves upward through said lower compartment to the intermediate and upper compartments, forming one wall thereof; means to remove the clean lint from the drum.

4. As in claim 3, a multiplicity of beater rolls adjacent the drum spaced one above the other; chutes arranged below the several rolls coacting therewith to guide and sustain the material for the action of the drum and beater rollers.

5. As in claim 3, a beater roll adjacent the drum; a chute arranged below the roll coacting therewith to guide and sustain the material for the action of the drum and beater roll, the chute being adjustable toward and from the drum, to vary the opening between the inner end of the chute and the teeth of the drum.

6. As in claim 3, a beater roll, adjacent the drum; a chute arranged below the roll, coacting therewith to guide and sustain the material for the action of the drum and beater roll, the chute being adjustable toward and from the drum to vary the opening between the inner end of the chute and the teeth of the drum, and having hinged to the underside of the chute a cover plate to enclose the upper side of the chamber beneath the chute, the cover moving with the chute when the chute adjustment is made.

7. As in claim 3, a boll breaker adjacent the feed opening to the intermediate compartment; a chute to receive material from the boll breaker and support and guide it against the upwardly moving face of the toothed drum.

8. In a cotton hull opener and separator, a frame-casing having a feed opening and a lint exit opening; a rotatable drum clothed with wire teeth, the inner face of the drum, opposed to the feed opening, moving upward to a lint exit opening; a boll breaking mechanism operatively arranged with respect to the feed opening; a chute adjacent the feed opening to receive the cracked-boll seed cotton from the boll breaker and guide it against the teeth of the drum; a knocker roll adjacent the upper part of the drum, to beat back hulls and loose material while permitting the drum engaged lint to pass on; means to remove the lint from the wire teeth.

9. As in claim 8, a trough below the knocker roll, to receive the material beaten back; a conveyor within the trough to move said material along the trough to a second exit opening; a second conveyor below said second exit opening to receive the descending material and return it within the casing; a chute over which the second conveyor moves the material and down which it is guided against the upwardly moving teeth of the drum.

Signed at Dallas, Texas, this second day of October 1926.

WILLIAM L. HANCOCK.